(12) United States Patent
Yasutomi et al.

(10) Patent No.: US 7,394,600 B2
(45) Date of Patent: Jul. 1, 2008

(54) LENS BARREL

(75) Inventors: Satoru Yasutomi, Hachioji (JP); Masaaki Sunaga, Oume (JP)

(73) Assignee: Olympus Imaging Corp., Tokyo (JP)

( * ) Notice: Subject to any disclaimer, the term of this patent is extended or adjusted under 35 U.S.C. 154(b) by 7 days.

(21) Appl. No.: 11/644,661

(22) Filed: Dec. 22, 2006

(65) Prior Publication Data

US 2008/0106788 A1    May 8, 2008

(30) Foreign Application Priority Data

Nov. 8, 2006 (JP) .............................. 2006-303288

(51) Int. Cl.
*G02B 15/14* (2006.01)

(52) U.S. Cl. ...................... 359/699; 359/704
(58) Field of Classification Search ......... 359/694–704, 359/819
See application file for complete search history.

(56) References Cited

U.S. PATENT DOCUMENTS 5,293,192 A * 3/1994 Akitake et al. ................ 396/62
6,035,136 A 3/2000 Hayashi ........................ 396/72
2005/0254144 A1* 11/2005 Sakamoto .................... 359/700

FOREIGN PATENT DOCUMENTS

JP    2004-233928    8/2004

* cited by examiner

*Primary Examiner*—Mohammed Hasan
(74) *Attorney, Agent, or Firm*—Straub and Pokotylo; John C. Pokotylo

(57) ABSTRACT

The lens barrel includes a second group frame forwardly/backwardly movable, which is provided with plural pairs of cam followers, a first cam unit as a rotatable frame member that allows switching of engagement with the cam follower, and includes plural pairs of cam grooves and loose fit grooves, and a cam frame that allows switching of engagement with the cam follower, and includes a second cam unit formed of plural pairs of cam grooves and loose fit grooves. The cam frame rotational phase where the first cam unit switches engagement with the cam follower is different from the cam frame rotational phase where the second cam unit switches engagement with the cam follower. This makes it possible to increase a forward/backward movement of the second group frame and reduces fluctuation of resistance against the drive load, thus preventing the image blur.

19 Claims, 9 Drawing Sheets

US 7,394,600 B2

LENS BARREL

This application claims benefit of Japanese Application No. 2006-303288 filed in Japan on Nov. 8, 2006, the contents of which are incorporated by this reference.

BACKGROUND OF THE INVENTION

1. Field of the Invention

The present invention relates to a structure of a lens barrel that employs a frame member movable along an optical axis.

2. Description of the Related Art

A generally employed lens barrel provided with a movable frame that is movable along the optical axis and a cam ring used for driving to move forward/backward the movable frame has a structure in which three single lined cam grooves formed at the cam ring side are respectively engaged with three cam followers formed at the movable frame side. The movable frame is driven to move forward/backward by driving the cam ring.

Japanese Unexamined Patent Application Publication No. 2004-233928 discloses the structure of the lens barrel that allows increase in a distance of forward movement of the movable frame member, and reduction in the length of the lens barrel in a retracted state. The disclosed lens barrel includes a cam ring that is driven to rotate, and a movable ring that is driven to move forward/backward while having the rotation restricted. FIGS. 10 and 11 show development views each showing an engagement of a cam follower of a movable ring 80 with a cam groove of the cam ring 110 in the lens barrel. FIG. 10 shows a wide state, and FIG. 11 shows a tele state, respectively.

Referring to FIGS. 10 and 11, three double rows (pairs) of cam grooves 110a1 and 110a2 are provided on the inner periphery of the cam ring 110. Three pairs of cam followers 80b1 and 80b2 are provided on the outer periphery of the movable ring 80. When the cam ring 110 is driven to rotate, the cam followers 80b1 and 80b2 are driven to move forward/backward along the cam grooves 110a1 and 110a2 such that the movable ring 80 is moved to a wide position and further to a tele position relative to the cam ring 110.

As shown in FIG. 10, one of the cam grooves, that is, 110a2 disappears at an intermediate position of the cam groove trace at a position to the front and rear of the wide position. During the driving at the position to the front and rear of the wide position, one of the cam followers, that is, 80b2 is disengaged from the cam groove 110a2 so as to be brought into a free state. As shown in FIG. 11, the other cam groove 110a1 disappears around the tele position, and the other cam follower 80b1 is disengaged from the cam groove 110a2 so as to be brought into a free state. During other driving period than at the position to the front and rear of the wide position and around the tele position, the cam followers 80b1 and 80b2 are engaged with the cam grooves 110a1, 110a2, respectively at the same time (see cam followers 80b1', 80b2').

Accordingly, the aforementioned lens barrel having the double row cam follower structure allows increase in the forward/backward movement distance to be longer in spite of the use of the cam ring that is shorter than the one using the mechanism for moving forward/backward the normal lens barrel that engages the single row cam groove with a single cam follower.

SUMMARY OF THE INVENTION

In an aspect of the present invention, a lens barrel is provided with a first frame member movable in a direction of an optical axis having a first cam follower and a second cam follower, and a second frame member formed of a cylindrical member having a pair of opening ends at both ends, which is rotatable around the optical axis relative to the first frame member. The second frame member includes a first cam groove having a portion of a cam engaged with the first cam follower formed on a circumferential surface, the cam disappearing at an intermediate point of the circumferential surface, and releasing an engagement with the first cam follower on a first cam locus required for moving the first frame member in the direction of the optical axis, a first disengaged portion at which the first cam follower is not engaged from an end where the first cam groove terminates to one end of the pair of opening ends on the cam locus, a second cam groove formed on the circumferential surface, and engaged with the second cam follower while the first cam follower is not engaged with the first cam groove on a second cam locus which is different from but congruent with the first cam locus required for moving the first frame member in the direction of the optical axis, and a second disengaged portion that is not engaged with the second cam follower on the second cam locus while the first cam follower is engaged with the first cam groove, and is being cut out at an intermediate point of the second cam locus and at the other end of the pair of opening ends. An engagement state is switched between an engagement of the first cam follower with the first cam groove and an engagement of the second cam follower with the second cam groove accompanied with a rotation of the second frame member.

In another aspect of the present invention, a lens barrel is provided with a first frame member movable in a direction of an optical axis having a first cam follower and a second cam follower, and a second frame member rotatable around the optical axis. The second frame member includes a first cam groove engaged with the first cam follower formed on a circumferential surface of the first frame member accompanied with a rotation of the second frame member, and disappears at an intermediate point on the circumferential surface of the second frame member, a first clearance continued with the first cam groove at the intermediate point on the circumferential surface to avoid a contact with the first cam follower, a second clearance that does not contact with the second cam follower on the circumferential surface of the second frame member while the first cam follower is engaged with the first cam groove, and a second cam groove engaged with the second cam follower at the intermediate point on the circumferential surface of the second frame member accompanied with the rotation of the second frame member while the first cam follower is not engaged with the first cam groove. When an engagement of the first cam follower with the first cam groove is released an engagement of the second cam follower with the second cam groove is started accompanied with the rotation of the second frame member.

In further aspect of the present invention, a lens barrel is provided with a first frame member formed of a frame member movable in a direction of an optical axis provided with a first cam follower unit including a first cam follower and a second cam follower, and a second cam follower unit including a third cam follower and a fourth cam follower; and a second frame member formed of a frame member rotatable around an optical axis. The second frame member includes a first cam unit which is a cam unit provided on a circumferential surface of the frame member, and has a first cam groove engaged with the first cam follower accompanied with a rotation of the frame member, which disappears at an intermediate point on a circumferential surface of the frame member, a first clearance continued with the first cam groove at the intermediate point on the circumferential surface to avoid a contact with the first cam follower, a second clearance that does not contact with the second cam follower on the circumferential surface of the frame member while the first cam follower is engaged with the first cam groove, and a second cam groove engaged with the second cam follower at the intermediate point on the circumferential surface of the frame member accompanied with the rotation of the frame member while the first cam follower is not engaged with the first cam groove. The first cam unit switches between the first cam groove and the second cam groove. The second frame member further includes a second cam unit which is a cam unit provided on the circumferential surface of the frame member, and has a third cam groove engaged with the third cam follower accompanied with the rotation of the frame member, which has the same configuration as that of the first cam groove and disappears at an intermediate point of the circumferential surface of the frame member, a third clearance continued with the third cam groove at the intermediate point on the circumferential surface to avoid a contact with the third cam follower, a fourth clearance that does not contact with the fourth cam follower on the circumferential surface of the frame member while the third cam follower is engaged with the third cam groove, and a fourth cam groove engaged with the fourth cam follower at the intermediate point on the circumferential surface of the frame member accompanied with the rotation of the frame member while the third cam follower is not engaged with the third cam groove, which has the same configuration as that of the second cam groove, and the second cam unit switches between the third and the fourth cam grooves. Switching between the first cam unit and the first cam follower unit, and the second cam unit and the second cam follower unit is sequentially performed.

The lens barrel according to the present invention employs a frame member which is short in the optical axis direction, and allows the lens optical system to be smoothly driven to move forward/backward for a greater distance.

Other features and advantages of the present invention will be clarified by the following explanations.

DESCRIPTION OF THE PREFERRED EMBODIMENTS

Figure 1:
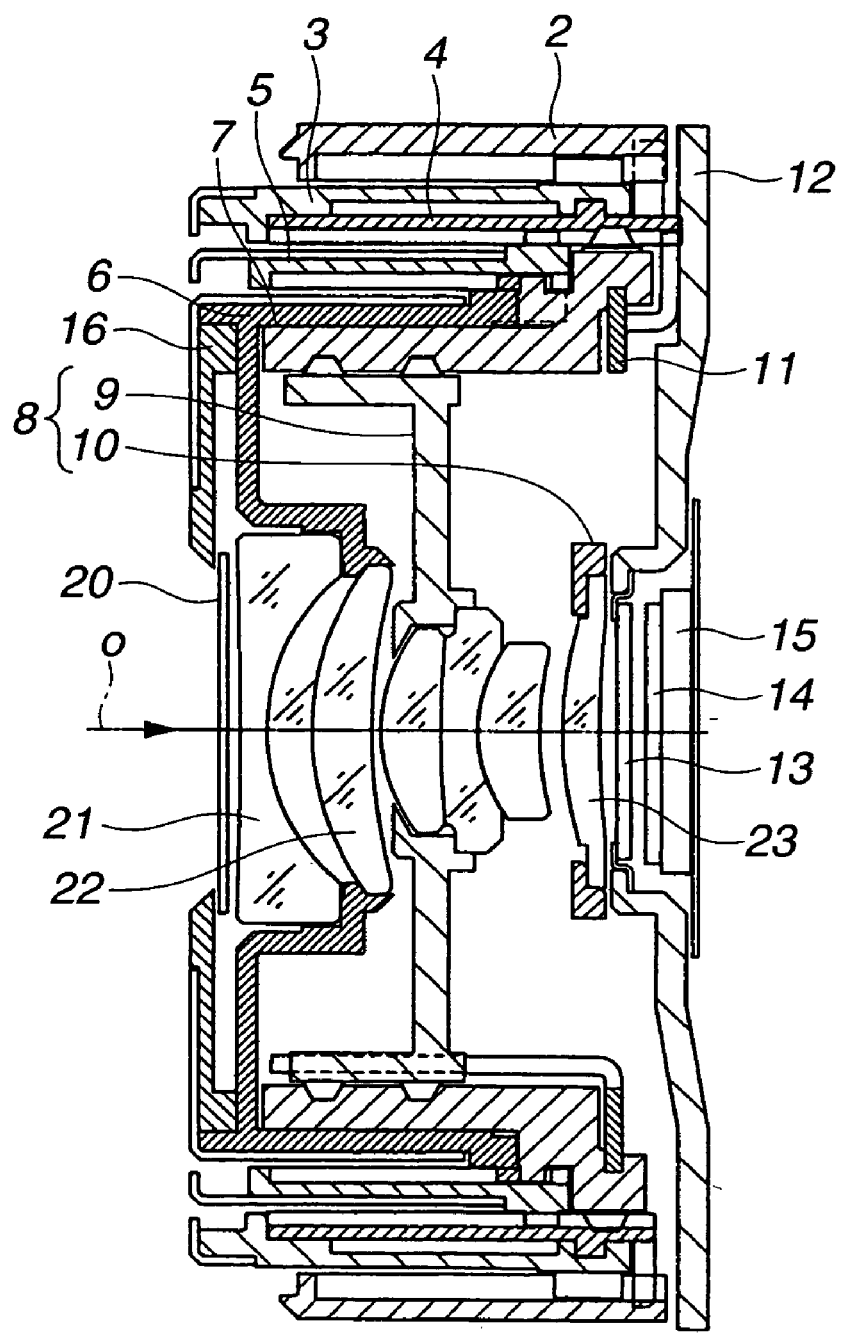
FIG. 1 is a sectional view of a lens barrel including an optical axis, which contains a frame in a retracted state according to a first embodiment of the present invention.

Embodiments of the present invention will be described referring to the drawings.

Figure 2:
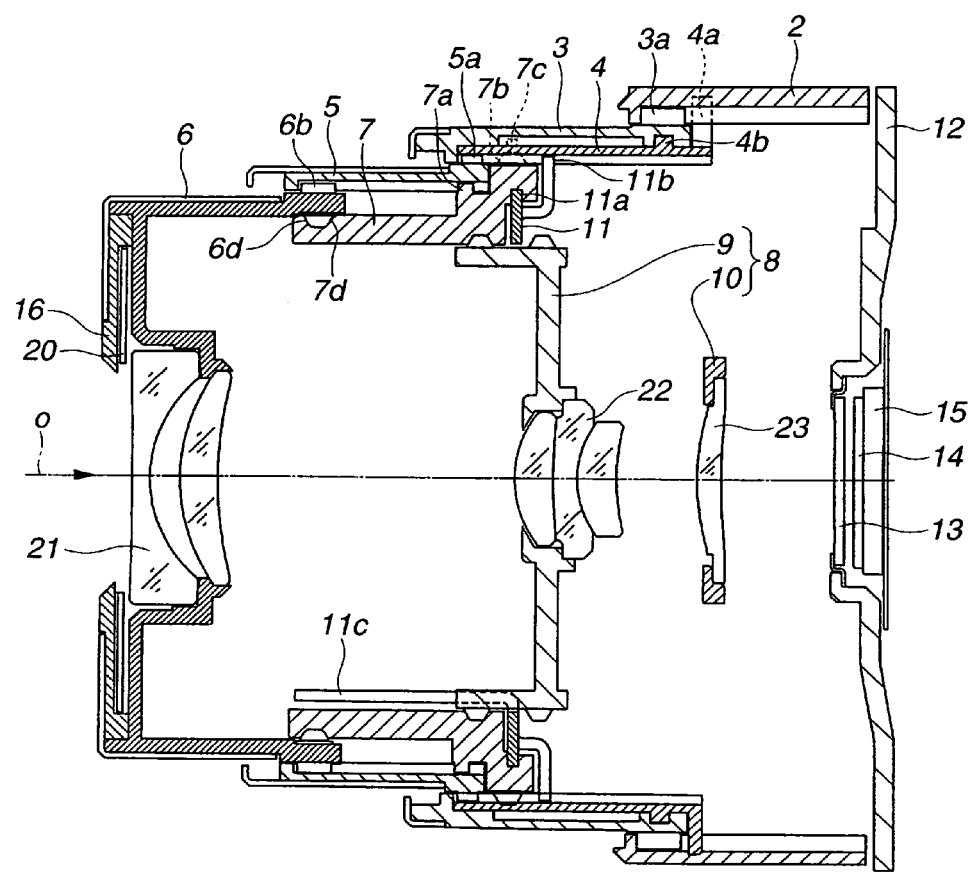
FIG. 2 is a sectional view of the lens barrel including the optical axis shown in FIG. 1 in a wide position.
Figure 3:
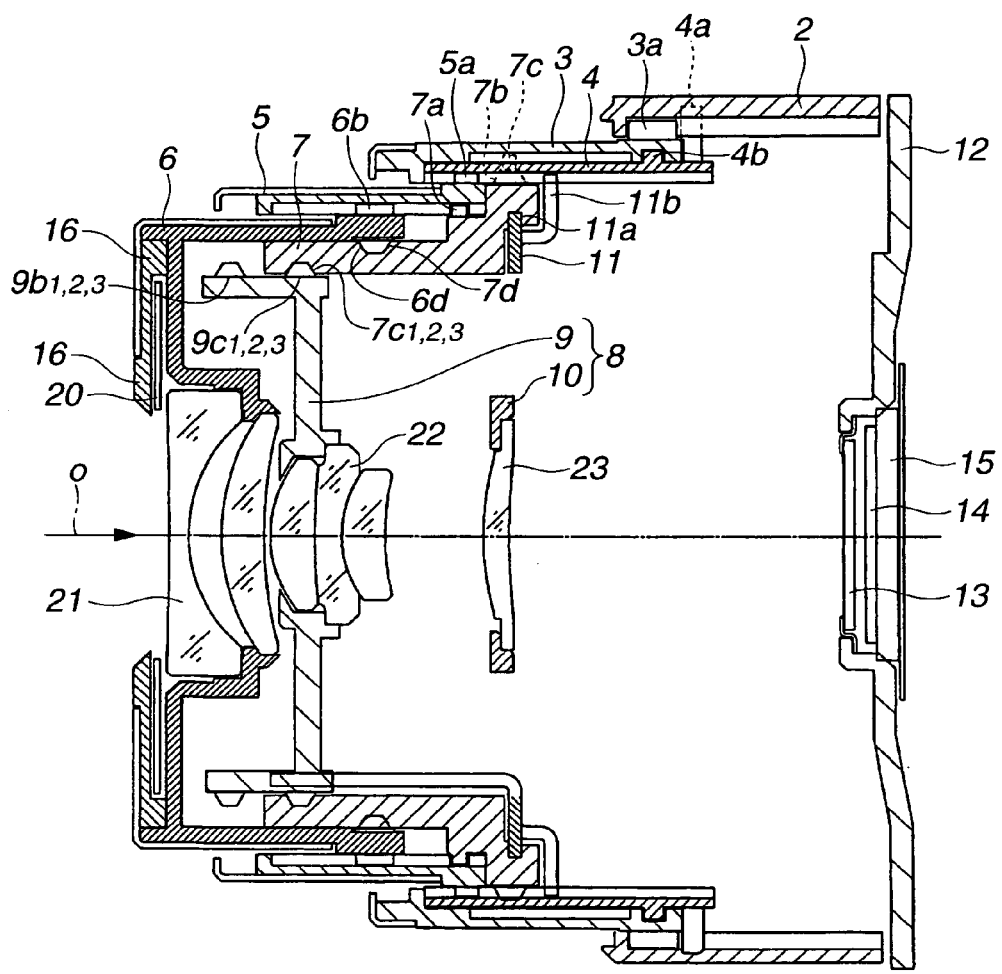
FIG. 3 is a sectional view of the lens barrel including the optical axis shown in FIG. 1 in a tele position.
Figure 4:
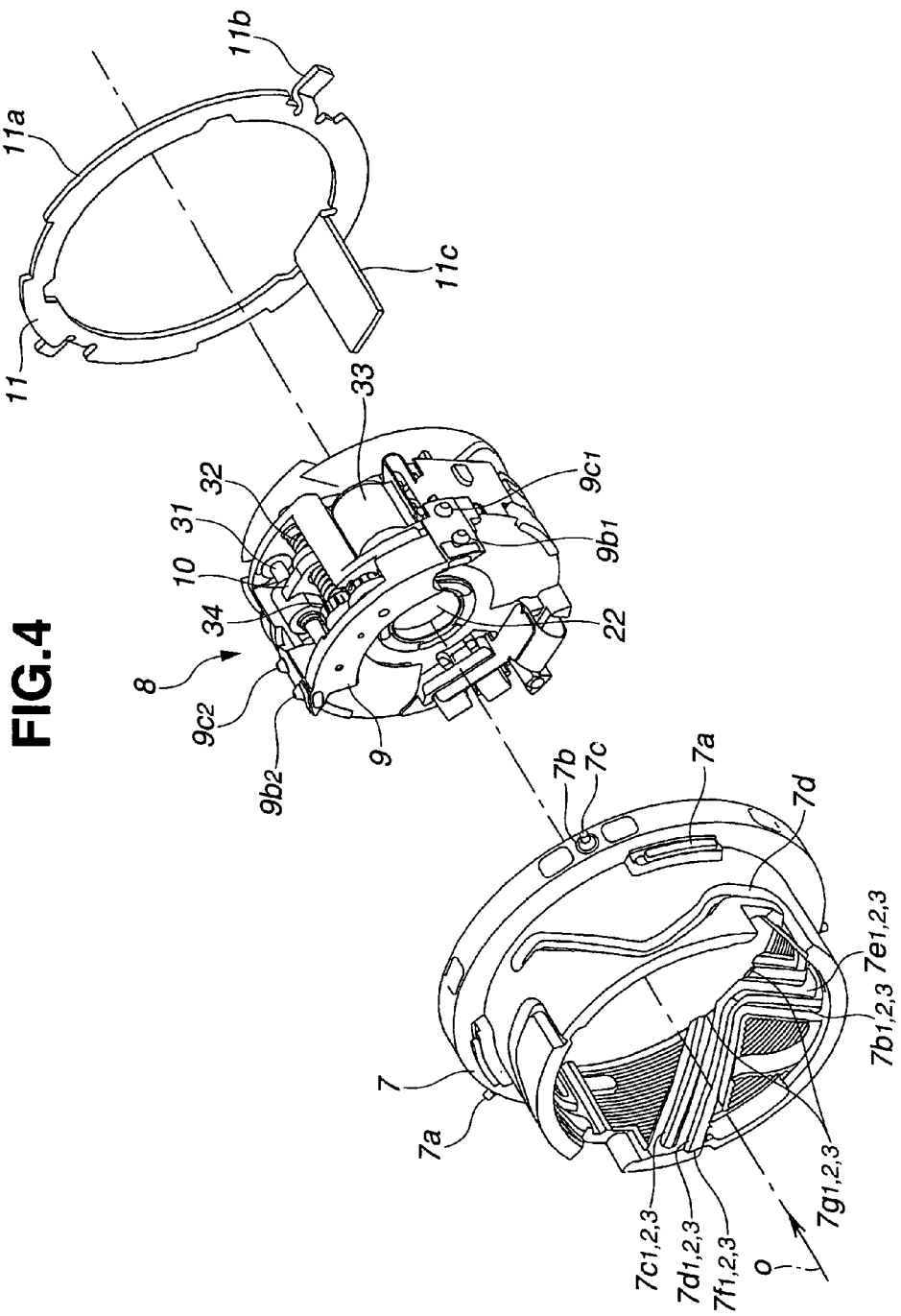
FIG. 4 is an exploded perspective view schematically showing a cam frame, second/third group frame units, and a float key that form the lens barrel frame forming the lens barrel shown in FIG. 1.
Figure 5:
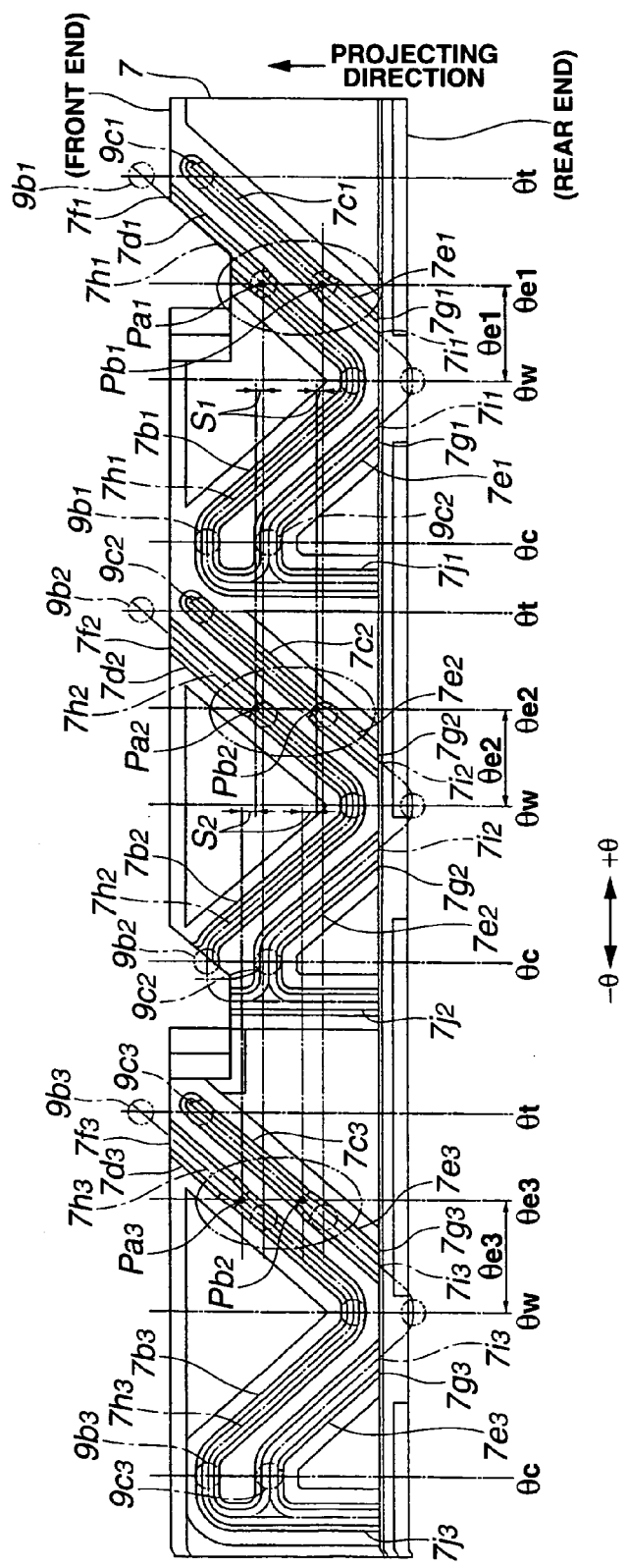
FIG. 5 is a development view of an inner peripheral surface of a cam frame shown in FIG. 4 in which a cam groove is formed.
Figure 6:
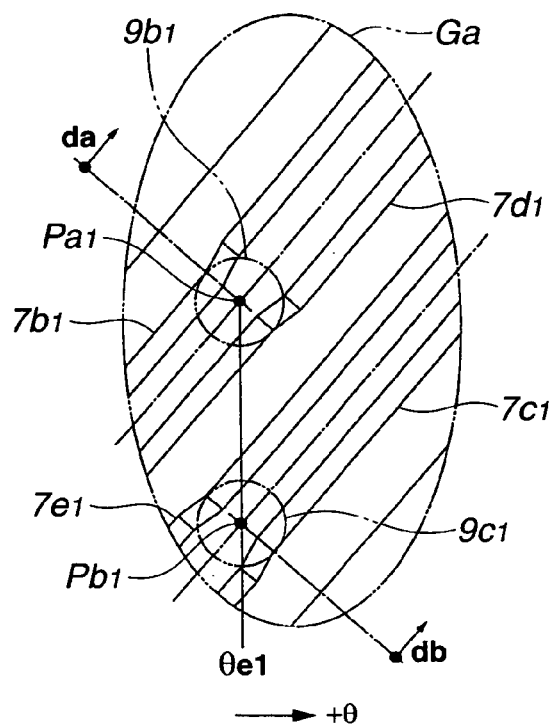
FIG. 6 is an enlarged development view of a cam groove switch portion of the cam frame shown in FIG. 4.

Each of FIGS. 1 to 3 is a sectional view of a lens barrel including an optical axis, which contains a lens barrel frame according to an embodiment of the present invention in the respective states. FIG. 1 shows the lens barrel in the retracted state. FIG. 2 shows the lens barrel in the wide position. FIG. 3 shows the lens barrel in the tele position. FIG. 4 is an exploded perspective view schematically showing the cam frame, second/third group frame unit, and the float key as the lens barrel frame which forms the lens barrel. FIG. 5 is a development view showing the inner peripheral surface of the cam frame in which cam grooves and loose fit grooves are formed as well as the cam followers engaged with the cam grooves. FIG. 6 is an enlarged development view of a cam groove switch portion of the cam frame.

In the following explanation, the optical axis of a shooting lens will be referred to as O, and a side of the lens barrel near a subject, and a side near an image forming surface in a direction of the optical axis O will be referred to as a front (projecting) side and a rear (retracting) side, respectively. The rotating direction of the frame member will be represented by the one viewed from the subject.

Referring to FIGS. 1 to 3, a lens barrel 1 of retractable zoom type includes a fixed frame 2, a rotary frame 3 supported by the fixed frame 2 and driven to rotate and move forward/backward upon zooming or retracting, a movable frame 4 that moves forward/backward together with the rotary frame 3 in the optical axis direction, a cam frame 7 as a second frame member that rotates together with the rotary frame 3 and moves forward/backward relative to the rotary frame 3 in the optical axis direction, a linear guide frame 5 that moves forward/backward together with the cam frame 7, a first group frame 6 driven by the cam frame 7 to move forward/backward along the optical axis, a cover plate 16 fixed to the front surface of the first group frame 6, a float key 11 that moves forward/backward along the optical axis together with the cam frame 7, a second/third group unit 8 having its rotating operation restricted by the float key 11, and driven by the cam frame 7 to move forward/backward along the optical axis, a hold plate 12 that is integrally connected to the rear end of the fixed frame 2, and a CCD unit held by the hold plate 12. The lens barrel 1 includes first group lens 21, second group lens 22, and third group lens 23 held by the first group frame 6, a second group frame 9, and a third group frame 10, respectively as the shooting lens groups.

The fixed frame 2, a cylindrical member fixed to a shooting device such as a camera body has a cam groove, a circumference groove, and a linear groove formed in the inner periphery.

The rotary frame 3 is a cylindrical member fit with the inner periphery of the fixed frame 2 and allowed to rotate and move forward/backward. A cam follower 3a slidably fit with the cam groove and the circumference groove formed in the fixed frame 2 is formed in the rear portion of the outer periphery, and a gear portion in mesh with a long gear (not shown) are formed in the rear portion of the outer periphery of the rotary frame 3. The linear groove and the circumference groove are formed in the inner periphery.

The rotary frame 3 is rotatably driven by a zoom drive motor (not shown) via the long gear so as to project from the retracted position to the position that allows shooting in the direction of the optical axis O. It is rotatably driven at the position that allows shooting upon zooming.

The movable frame 4 is a cylindrical member that is allowed to make a relative rotation to fit into the inner periphery of the rotary frame 3. A cam groove for a cam frame inclined with respect to the direction of the optical axis O, and a linear groove for the float key/linear guide frame are formed in the inner periphery of the movable frame 4.

The movable frame 4 is bayonet connected to the rotary frame 3 by a circumference projection 4b fit with the circumference groove formed in the rotary frame 3 in the state while having the rotating operation restricted by a guide projection 4a fit with the linear groove formed in the fixed frame 2. The movable frame 4 is supported so as to move forward/backward along the optical axis O together with the rotary frame 3 while having its rotating operation restricted by the fixed frame 2.

The cam frame 7 fit into the inner periphery of the movable frame 4 is a cylindrical member having an opening at each end. A cam follower 7b having a protrusion 7c at its top is formed on the rear portion of the outer periphery of the cam frame 7. A guide protrusion 7a is formed on the outer periphery in the circumferential direction as well as a first group cam groove 7d inclined with respect to the direction of the optical axis O.

Referring to FIG. 5, three cam follower insertion grooves 7j1, 7j2 and 7j3 along the direction of the optical axis O, and three pairs of cam grooves and loose fit grooves along the cam locus for driving the second group frame communicated with the +θ side of the cam follower insertion grooves are formed in the inner periphery of the cam frame 7. Configurations of the cam groove and the loose fit groove will be described in more detail later.

The cam follower 7b of the cam frame 7 penetrates the movable frame 4 while being slidably engaged with the cam groove thereof. The protrusion 7c is fit with the linear groove of the rotary frame 3. Therefore, the cam frame 7 rotates around the optical axis O together with the rotary frame 3, and supported so as to relatively move forward/backward along the optical axis O.

The linear guide frame 5 is a cylindrical member that is fit into the inner periphery of the movable frame 4 and allowed to move forward/backward along the optical axis O. It is provided with a guide protrusion 5a on its outer periphery, and a circumferential guide groove and a linear guide groove on its inner periphery.

The linear guide frame 5 allows the guide protrusion 5a to be slidably fit into the linear groove of the movable frame 4, and the guide protrusion 7a of the cam frame 7 to be fit into the circumferential guide groove for making a bayonet connection between the linear guide frame 5 and the cam frame 7. Accordingly, the linear guide frame 5 is supported so as to move forward/backward along the optical axis O together with the cam frame 7, while having the rotating operation restricted by the movable frame 4.

The first group frame 6 is a cylindrical frame member that is fit between the inner periphery of the linear guide frame 5 and the outer periphery of the cam frame 7, and driven to move forward/backward along the optical axis O. It is provided with a protruding cam follower 6d on its inner periphery, and a guide protrusion 6b along the direction of the optical axis O on its outer periphery. A first group lens 21 is held in a front opening. The cover plate 16 is fixed to the front surface of the first group frame 6. A lens barrier 20 that opens and closes the front surface of the first group lens 21 is provided between the cover plate 16 and the first group frame 6.

The cam follower 6d of the first group frame 6 is fit into the cam groove 7d of the cam frame 7. A guide protrusion 6b is fit into the linear groove of the linear guide frame 5. Therefore, the first group frame 6 is driven to move forward/backward along the optical axis O by the cam frame 7 while having its rotating operation restricted by the linear guide frame 5.

The float key 11 is an annular member provided with a protrusion 11b formed on the outer periphery to protrude therefrom, and a guide protrusion 11c formed on the outer periphery to extend forward. The float key 11 is bayonet connected to the cam frame 7 in the state where the protrusion 11b is slidably fit into the linear groove of the movable frame 4, and an outer peripheral portion 11a is slidably fit into the circumferential guide groove at the rear portion of the cam frame 7. Therefore, the float key 11 is driven to move forward/backward together with the cam frame 7 while having its rotating operation restricted by the movable frame 4.

Referring to FIG. 4, the second/third group unit 8 is formed of a second group frame 9 as a first frame member for holding a second group lens 22 and a third group frame 10 for holding a third group lens 23.

The second group frame 9 is a cylindrical frame member that is fit into the inner periphery of the cam frame 7 so as to be supported. Three pairs of cam followers (cam followers in multiple rows) are provided circumferentially on the outer periphery of the second group frame, each pair of which is engaged with the cam groove and inserted (loosely fit) into the loose fit groove of the cam frame 7 thereinto. The cam followers in each pair are arranged apart from each other in parallel to the optical axis O (see FIG. 5). The arrangement of the cam followers will be described in detail below.

The second group frame 9 has a linear guide groove (not shown) through which the guide protrusion 11c of the float key 11 slidably penetrates. The second group frame 9, thus, is allowed to move forward/backward along the optical axis accompanied with the rotation of the cam frame 7 while having the rotating operation restricted by the float key 11.

The third group frame 10 is supported so as to move forward/backward by the second group frame 9 via a guide shaft 31 and a rotary restricting shaft (not shown). The third group frame 10 is rotatably driven by a feed screw 32 driven by a focusing motor 33 via a gear row 34 upon driving for retracting and focusing so as to move forward/backward along the optical axis O relative to the second group frame 9.

The hold plate 12 is fixed to the rear end of the fixed frame 2 while supporting an optical low-pass filter 13 and a shooting element 15 provided with a protection glass 14.

An image is formed on the image-forming surface of the shooting element 15 by transmission of light rays of the subject through the respective lens groups 21 to 23 such that an image capturing electric signal with respect to the subject is output by the shooting element 15.

The forward/backward movement of the lens barrel 1 with the above-described structure will be described referring to FIGS. 1 to 3.

When the lens barrel 1 is in the retracted state as shown in FIG. 1, the rotary frame 3, the movable frame 4, the linear guide frame 5, the first group frame 6, and the cam frame 7 are all retracted to the retracted position within the fixed frame 2. The second group frame 9 and the third group frame 10 are retracted to the retracted position within the cam frame 7 such that the cam frame 7, the linear guide frame 5, the rotary frame 3, the movable frame 4, the fixed frame 2, and the second/third group unit 8 are stored between the subject side end of the first group frame 6 and the hold plate 12 to the rear of the optical axis O. The lens barrier 20 is at the closing position that covers the front surface of the first group lens 21.

When the rotary frame 3 is turned counterclockwise by a predetermined angle for the purpose of bringing the lens barrel 1 to a wide position for capturing images, the rotary frame 3 moves forward together with the movable frame 4 to the position as shown in FIG. 2 at which the image may be captured. The rotary frame 3 rotatably drives the cam frame 7 so as to be projected together with the linear guide frame 5 to the position at which the image may be captured. The rotation of the cam frame 7 and the projecting operation cause the first group frame 6 to project to the wide position.

Meanwhile, the second group frame 9 moves backward relative to the cam frame 7 to the wide position. At this time, the cam followers 9c1, 9c2, 9c3 (described later) of the aforementioned pairs of the cam followers of the second group frame 9 at the rear side are disengaged from the cam grooves of the cam frame 7. They protrude backward from the rear end of the cam frame 7 so as to be exposed. The third group frame 10 is driven to move forward/backward to the focusing position located further backward.

When the rotary frame 3 is rotatably driven by a predetermined angle counterclockwise to the position where the image may be captured for the purpose of bringing the lens barrel 1 to the tele position, the cam frame 7 is further rotated as shown in FIG. 3 so as to be slightly retracted together with the linear guide frame 5 to the tele position. The rotation of the cam frame 7 and the retracting operation makes the first group frame 6 retracted to the tele position.

Meanwhile, the second group frame 9 moves forward relative to the cam frame 7, and the cam followers 9b1, 9b2, 9b3 (described later) of the aforementioned pairs of the cam followers of the second group frame 9 at the front side are disengaged from the cam grooves of the cam frame 7. They protrude forward from the front end of the cam frame 7 to move to the exposed tele position. The third group frame 10 also moves forward to the focusing position.

Arrangement and configuration of the cam groove and loose fit groove formed on the inner peripheral surface of the cam frame 7, and the cam follower provided on the outer peripheral surface of the second group frame 9, and the cam groove switching operation upon drive of the forward/backward movement of the second group frame 9 relative to the cam frame 7 will be described in detail referring to FIG. 5 as a development view of the inner peripheral surface of the cam frame, and FIG. 6 as an enlarged development view of the cam groove switch portion of the cam frame (around the cam groove switch rotation position θe1).

The rotating position (angle) θ on the development view of FIG. 5 indicates the rotating position of the cam follower of the second group frame 9 relative to the cam frame 7. Actually, the cam frame 7 rotates relative to the second group frame 9.

In the explanation below, the angle θ is the same as the rotating angle of the cam frame 7. The rotating angle of the cam frame 7 counterclockwise will be referred to as +θ (the relative movement of the cam follower to the right in FIG. 5), and that of the cam frame 7 clockwise will be referred to as −θ (the relative movement of the cam follower to the left in FIG. 5) hereinafter.

The cam follower provided on the outer periphery of the second group frame 9 is formed of the group of three pairs of cam followers having taper surfaces, that is, cam followers 9b1 and 9c1 as a pair of first and the second cam followers, cam followers 9b2 and 9c2 as a pair of first and second, or third and fourth cam followers, and cam followers 9b3 and 9c3 as a pair of third and fourth cam followers. The aforementioned three pairs of the cam followers are disposed circumferentially on three different points. The three pairs of the cam followers are at constant positions, and the cam followers of each pair are apart from each other at a predetermined distance in the direction of the optical axis O (see FIGS. 4 and 5).

Meanwhile, three groups of pair taper grooves are formed on the inner periphery of the cam frame 7. The group of the taper grooves is formed of the cam grooves for driving the second group frame 9 in the direction of the optical axis O, engaged with the corresponding cam follower group of the second group frame 9 (tightly fit, or fit with a gap that does not adversely affect the optical performance of the lens barrel), and a loose fit groove that allows loose fitting (fit with the gap) which are provided along three pairs of cam locus serving as the center path of the groove.

The cam locus has the same path (three pairs) that inclines with respect to the optical axis O of the cam frame 7, and is formed as three pairs of cam locus arranged at three different positions in the inner circumferential direction while corresponding to the above-described cam follower of the second group frame 9. The cam locus denotes a cam path along which the frame member having the cam follower (second group frame 9 in the present description) is moved in the direction of the optical axis O as designed.

One of the aforementioned three pairs of cam locus is formed of cam loci 7h1 (first cam locus) and 7i1 (second cam locus). Another one is formed of the cam loci 7h2 (first cam locus) and 7i2 (second cam locus) which are arranged adjacent with each other to the −θ side of the aforementioned cam locus, and congruent with the cam loci 7h1 and 7i1, respectively.

Furthermore, another one is formed of the cam loci 7h3 (first cam locus) and 7i3 (second cam locus) which are arranged adjacent with each other to the −θ side of the aforementioned cam locus, and congruent with the cam loci 7h1 and 7i1, respectively.

Each pair of the cam loci 7h1 and 7i1, 7h2 and 7i2, and 7h3 and 7i3 is moved and provided parallel to the optical axis O by the distance corresponding to the interval between the pair of the cam followers of the second group frame 9 in the direction of the optical axis O.

One of the three pairs of cam grooves and loose fit grooves of the cam frame 7 is formed of a cam groove (first cam groove) 7b1 arranged along the cam locus 7h1, a loose fit groove (first clearance, disengaged portion) 7d1 connected to the +θ side of the cam groove in a communication therewith, a loose fit groove (second clearance, disengaged portion) 7e1 arranged along the cam locus 7i1, and a cam groove (second cam groove) 7c1 connected to the +θ side of the loose fit groove in communication therewith.

Each of the loose fit grooves may be defined as the groove having the cam locus without cam groove when viewed from the respective cam grooves.

Another one of the three pairs of cam grooves and loose fit grooves of the cam frame 7 is formed of a cam groove (third, first cam groove) 7b2 arranged along the cam locus 7h2, a loose fit groove (third, first clearance, disengaged portion) 7d2 connected to the +θ side of the cam groove in communication therewith, a loose fit groove (fourth, second clearance, disengaged portion) 7e2 arranged along the cam locus 7i2, and a cam groove (fourth and second cam grooves) 7c2 connected to the +θ side of the loose fit groove in communication therewith.

Furthermore, another one is formed of a cam groove (third, first cam groove) 7b3 arranged along the cam locus 7h3, a loose fit groove (third, first clearance, disengaged portion) 7d3 connected to the +θ side of the cam groove in communication therewith, a loose fit groove (fourth, second clearance, disengaged portion) 7e3 arranged along the cam locus 7i3, and a cam groove (fourth, second cam grooves) 7c3 connected to the +θ side of the loose fit groove in communication therewith.

Each of the loose fit grooves 7d1, 7d2, and 7d3 terminates at the front end of the cam frame 7, and has a groove opening 7f1, 7f2 and 7f3, respectively. Each of the loose fit grooves 7e1, 7e2 and 7e3 disappears at the rear end of the cam frame 7, and has two groove openings 7g1, 7g2 and 7g3, respectively.

Each of the cam grooves 7b1, 7b2, 7b3, 7c1, 7c2 and 7c3 has a trapezoidal cross section having the width with which the cam follower of the second group frame 9 is tightly fit (more specifically, the cross section having its width narrowed as its depth increases).

Meanwhile, each of the loose fit grooves 7d1, 7d2, 7d3, 7e1, 7e2 and 7e3 has a trapezoidal cross section having the width with which the cam follower of the second group frame 9 is loosely fit (more specifically, the cross section having its width narrowed as its depth increases).

The cam grooves 7b1, 7b2 and 7b3 are communicated with the loose fit grooves 7d1, 7d2 and 7d3 at corresponding groove switch points Pa1, Pa2 and Pa3, respectively. The width of each groove is gradually increased from the groove switch point toward the corresponding loose fit groove (+θ side).

Likewise, the cam grooves 7c1, 7c2 and 7c3 are communicated with the loose fit grooves 7e1, 7e2 and 7e3 at corresponding groove switch points Pb1, Pb2 and Pb3, respectively. The width of each groove is gradually increased from the groove switch point toward the corresponding loose fit groove (−θ side).

The groove switch points Pa1 and Pb1, Pa2 and Pb2, and Pa3 and Pb3 are arranged along the direction of the optical axis O in pairs in a range from the wide rotational position θw to the tele rotational position θt. They are circumferentially arranged on cam groove switch rotational positions θe1, θe2 and θe3 each apart from the wide rotational position θw by the different angle.

More specifically, those cam groove switch rotational positions are different from one another at positions apart from the wide rotational position θw at different angles θe1, θe2 and θe3, respectively. The relationship of those positions may be expressed as follows in the first embodiment;

$$\theta e1 < \theta e2 < \theta e3 \quad (1).$$

The aforementioned distant rotational angle position may be expressed as follows irrespective of the above relationship (1):

$$\theta e1 \neq \theta e2, \theta e2 \neq \theta e3, \theta e1 \neq \theta e3 \quad (2).$$

Referring to FIG. 5, switch points of the cam follower at the cam groove switch rotational positions θe1, θe2 and θe3 in the direction of the optical axis O between the cam groove and the loose fit groove are different. Accordingly, each projection amount of the second group frame 9 relative to the cam frame 7 in the direction of the optical axis O at the respective cam groove switch rotational points θe1, θe2 and θe3 becomes different.

More specifically, a positional difference S1 in the direction of the optical axis exists between the relative projection position of the second group frame 9 relative to the cam frame 7 to the direction of the optical axis O at the cam groove switch rotational position θe1 of the cam followers 9b1 and 9c1 and the relative projection position of the second group frame 9 relative to the cam frame 7 to the direction of the optical axis O at the cam groove switch rotational position θe2 of the cam followers 9b2 and 9c2.

Further, a positional difference S2 in the direction of the optical axis O also exists between the relative projection position of the second group frame 9 relative to the cam frame 7 to the direction of the optical axis O at the cam groove switch rotational position θc2 of the cam followers 9b2 and 9c2 and the relative projection position of the second group frame 9 relative to the cam frame 7 to the direction of the optical axis O at the cam groove switch rotational position θe3 of the cam followers 9b3 and 9c3.

The cam follower of the second group frame 9 is engaged with the corresponding cam groove of the cam frame 7, and loosely fit with the corresponding loose fit groove. The term "engage" denotes the state of tight fitting or fitting with little gap that hardly affects the lens optical performance of the lens barrel adversely. The term "loosely fit" denotes the state of fitting with the gap, or fitting disengaged with no contact.

The second group frame 9 is projected by the cam groove engaged with the cam follower from the retracted position to the wide and tele positions that allow shooting accompanied with the rotation of the cam frame 7. When the lens barrel 1 is retracted, the cam follower is at the retracted rotational position (angle) θc of the cam frame 7. In the aforementioned state, one group of the cam followers of the second group frame 9, that is, at least two of 9b1, 9b2 and 9b3 are tightly engaged with the corresponding cam grooves 7b1, 7b2 and 7b3. The other cam followers 9c1, 9c2 and 9c3 are inserted into the loose fit grooves 7e1, 7e2 and 7e3 each with a gap. In this state, the second group frame 9 is stored inside the cam frame 7 (see FIG. 1).

When the cam frame 7 rotates from the retracted rotational position θc toward the wide rotational position θw, one group of the cam followers of the second group frame 9, that is, 9b1, 9b2 and 9b3 are tightly engaged with the cam grooves 7b1, 7b2 and 7b3, respectively. The second group frame 9 is retracted along the cam groove to the wide position relative to the cam frame 7 (it is projected relative to the fixed frame 2). During the aforementioned period, the other cam followers of the second group frame 9, that is, 9c1, 9c2 and 9c3 are inserted to pass through the loose fit grooves 7e1, 7e2 and 7e3 each with a gap.

Reaching the wide rotational position θw, the second group frame 9 relatively moves backward to the wide position. At this time, the other cam followers are brought into the released state where they extend backward from the rear end (disengaged from the loose fit grooves) such that the second group frame 9 partially protrudes from the rear end (see FIGS. 2 and 5).

When the cam frame 7 starts rotating from the wide rotational position θw to the tele rotational position θt, the second group frame 9 is projected forward while holding one group of the cam followers 9b1, 9b2 and 9b3 engaged with the cam grooves 7b1, 7b2 and 7b3, respectively. The other cam followers 9c1, 9c2 and 9c3 are inserted into the loose fit grooves 7e1, 7e2 and 7e3 each with the gap again.

When the cam frame 7 reaches the cam groove switch rotational position θe1, the cam follower 9b1 reaches the groove switch point Pa1, and at the same time, the cam follower 9c1 reaches the groove switch point Pb1. The cam follower 9b1 moves to the loose fit groove 7d1 (range da for fitting with a gap shown in FIG. 6), and the cam follower 9c1 is switched to be engaged with the cam groove 7c1 (range db for fitting with no gap shown in FIG. 6).

The cam frame 7 is rotated toward +θ while holding the other cam followers 9b2 and 9b3 engaged with the cam grooves 7b2 and 7b3, and the cam followers 9c2 and 9c3 inserted in the loose fit grooves 7e2 and 7c3 so as to project the second group frame 9 to the tele position.

When the cam frame 7 reaches the cam groove switch rotational position θe2, the cam follower 9b2 reaches the groove switch point Pa2, and at the sane time, the cam follower 9c2 reaches the groove switch point Pb2. The cam follower 9b2 moves to the loose fit groove 7d2 so as to switch to the state such that the cam follower 9c2 is engaged with the cam groove 7c2.

When the cam frame 7 reaches the cam groove switch rotational position θe3, the cam follower 9b3 reaches the groove switch point Pa3, and at the same time, the cam follower 9c3 reaches the groove switch point Pb3. Then the cam follower Pb3 further moves to the loose fit groove 7d3 so as to switch the state such that the cam follower 9c3 is engaged with the cam groove 7c3.

Thereafter, the cam frame 7 is further rotated toward +θ to the tele rotational position θt while holding the cam followers 9c1, 9c2 and 9c3 tightly engaged with the cam grooves 7c1, 7c2 and 7c3, and the cam followers 9b1, 9b2 and 9b3 inserted into the loose fit grooves 7d1, 7d2 and 7d3. The second group frame 9, then is projected to the tele position.

Before the cam frame 7 reaches the tele rotational position θt, the cam followers 9b1, 9b2 and 9b3 are released (disengaged) from the loose fit grooves 7d1, 7d2 and 7d3 so as to protrude from the front end of the cam frame 7. The second group frame 9 also partially protrudes from the front end (see FIGS. 3 and 5).

In the case where the cam frame 7 is returned from the tele rotational position θt to the retracted rotational position θc via the wide rotational position θw, the aforementioned operations in reverse order are performed. That is, the engagement and loose fitting of the cam followers with the cam grooves and loose fit grooves are switched such that the second group frame 9 is retracted to the retracted position from the tele position via the wide position.

As described above, since the lens barrel 1 according to the embodiment is provided with three pairs of cam followers and three pairs of cam grooves, when the second group frame 9 reaches the wide position or the tele position, it is possible to partially protrude the second group frame 9 including the cam follower from the rear end or front end of the cam frame 7 relative thereto. This makes it possible to increase the displacement amount of the second group frame 9. In the retracted state, the second group frame 9 is stored within the cam frame 7, thus reducing the length of the lens barrel.

In the embodiment, the cam groove switch is performed on the rotational phase at the different rotational position sequentially such that the number of engagement between the cam follower and the cam groove is constantly kept from exceeding three points. The cam groove switch is simultaneously performed between the pair of the cam followers.

This makes it possible to avoid clogging of the cam engagement or a considerable change in the rotational load of the cam frame 7 at the cam groove switch rotational position or in the cam driving range, thus suppressing the required torque for the zoom drive motor. Further, this makes it possible to prevent oscillation in the second group frame 9 without generating the play in the cam follower during the switching operation, thus suppressing blurring of the captured image.

In this case, as the drive load is not increased, each weight and size of the rotary frame 3, the cam frame 7, the second group frame 9 and the like may be reduced.

In the lens barrel 1 of the aforementioned embodiment, the relationship among the cam groove switch rotational positions θe1, θe2 and θe3 is the one shown in the equation (1). The cam groove switch is performed at the rotational positions in order of θe1, θe2 and θe3. However, the similar effect may be obtained even if the order of the rotational positions is changed.

Each configuration of the loose fit grooves formed on the inner peripheral surface of the cam frame 7 is not limited to the one having the cam locus as the center path. For example, the loose fit groove may be a clearance along the cam locus having a gap or through which the cam follower of the second group frame 9 passes in noncontact with the groove, and may be configured to be communicated with the groove switch point of the cam groove for providing the similar effects.

In the lens barrel 1 of the aforementioned embodiment, the cam groove switch of one pair of the cam followers corresponding to one pair of the cam groove may be switched simultaneously, for example, at the cam groove switch rotational position θe1. More specifically, switching of the cam follower engaged with the cam groove to fitting with the loose fit groove is simultaneously performed with switching of the other cam follower fit with the loose fit groove to engagement with the cam groove.

In the embodiment, in the case where the deviation in the engagement phase occurs due to positional accuracies of the cam groove and the cam follower, which occurs only at the time of cam groove switching, the cam follower may be loosened or the cam engagement may be clogged, resulting in the problem of increasing the drive load.

Therefore, two modified examples (first and second modified examples) each relating to the cam frame for the purpose of solving the aforementioned problem by switching the cam groove in the rotational range with a predetermined width will be described hereinafter. The structure and employed members which are the same as those of the aforementioned embodiment will be designated with the same reference numerals, and the portion different from the embodiment will only be described.

Figure 7:
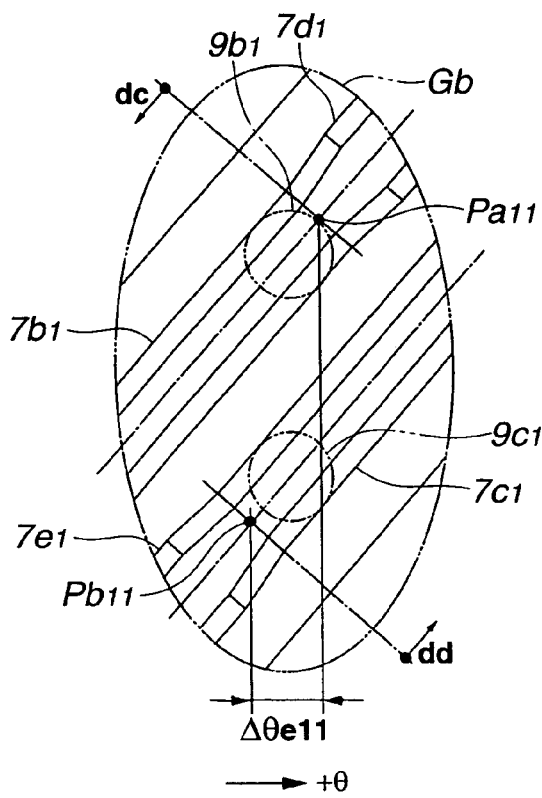
FIG. 7 is an enlarged development view of a cam groove switch portion of the cam frame shown in FIG. 4 as a first modified example.

FIG. 7 is an enlarged development view of the cam groove switch portion (around the switch range Δθe11) of the cam frame according to the first modified example.

The cam frame of the modified example is provided with cam groove switch rotational ranges Δθe11, Δθe12 and Δθe13 (not shown) between the wide rotational position θw and the tele rotational position θt of three pairs of cam grooves/loose fit grooves instead of the cam groove rotational positions θe1, θe2 and θe3 in the first embodiment.

The cam groove switch rotational range Δθe11 of one pair of the cam groove/loose fit groove includes a groove switch point Pb11 at which a cam groove switch portion Gb is communicated with the loose fit groove 7e1 with which the cam follower 9c1 is loosely fit, and with the cam groove 7c1 with which the cam follower 9c1 is tightly engaged, and a groove switch point Pa11 at which the cam groove 7b1 with which the cam follower 9b1 is engagebale is communicated with the loose fit groove 7d1 with which the cam follower 9b1 is loosely fit. The range from the groove switch point Pb11 toward the +θ side of the rotational angle of the cam frame 7 may be defined as the range dd where the cam follower is tightly fit. The range from the groove switch point Pa11 toward the −θ side of the rotational angle of the cam frame 7 may be defined as the range dc where the cam follower is tightly fit.

The range of the rotational angle of the cam frame 7 defined by the groove switch points Pb11 and Pa11 is a cam groove switch rotational range $\Delta\theta e11$ which allows the switching as the area that prevents loosening of the cam follower (tight fitting) in the modified example.

Each of the other two pairs of cam groove/loose fit groove of the modified example is provided with cam groove switch rotational ranges $\Delta\theta e12$ and $\Delta\theta e13$ (not shown) instead of the cam groove switch rotational positions $\theta e2$ and $\theta e3$ in the aforementioned embodiment. In those cam groove switch rotational ranges $\Delta\theta e12$ and $\Delta\theta e13$, the tight fit state of the cam follower is maintained as described above.

Those cam groove switch rotational ranges $\Delta\theta e11$, $\Delta\theta e12$ and $\Delta\theta e13$ are arranged so as not to be overlapped with one another in the rotational range from the wide rotational position $\theta w$ to the tele rotational position $\theta t$. This may prevent two or three of the cam groove switch rotational ranges $\Delta\theta e11$, $\Delta\theta e12$ and $\Delta\theta e13$ from being overlapped during rotation of the cam frame 7. In other words, the simultaneous switching operation never occurs.

Each width of the cam groove switch rotational ranges $\Delta\theta e11$, $\Delta\theta e12$ and $\Delta\theta e13$ may be set such that the cam groove engaged with one cam follower is at least partially overlapped with the cam groove engaged with the other cam follower even if variations of the cam frame 7 and the second group frame 9 become maximum. In other words, in the aforementioned cam groove switch rotational range, the cam follower is not loosened owing to the variation upon the switching operation.

The aforementioned variation is considered to be caused by the part dimension accuracy and assembly accuracy.

In the modified example, upon zooming from the wide state to the tele state, the cam frame 7 rotates to allow a pair of cam followers to reach the cam groove switch rotational range $\Delta\theta e11$ where the cam followers 9b1 and 9c1 respectively engage with the cam grooves 7b1 and 7c1 simultaneously. Accordingly, when the cam followers are in the switch rotational range $\Delta\theta e11$, no looseness due to difference in accuracy of the switch position occurs. Accordingly, the looseness or oscillation of the second group frame 9 may be suppressed.

Thereafter, the other two pairs of cam followers reach the cam groove switch rotational ranges $\Delta\theta e12$ and $\Delta\theta e13$, sequentially. Each pair of the cam followers may be engaged with the corresponding pair of the cam grooves as described above. This may also prevent the looseness or oscillation of the second group frame 9 during the cam groove switching operation.

In the first modified example of the embodiment, when the cam groove of the cam frame and the cam follower of the second group frame 9 slidably contact and engage at three points, they momentarily slidably contact and engage at four points during the rotation of the cam frame. Then, they engage at three points. The slidable contact and engagement at four points occurs momentarily three times during the entire cam locus cycle.

The cam frame according to the modified example is capable of suppressing the looseness and oscillation of the second group frame 9 reliably in the cam groove switch rotational range in spite of dimensional variation and assembly variation in the cam frame, the second group frame and the like.

A cam frame of the second modified example will be described referring to FIG. 8.

Figure 8:
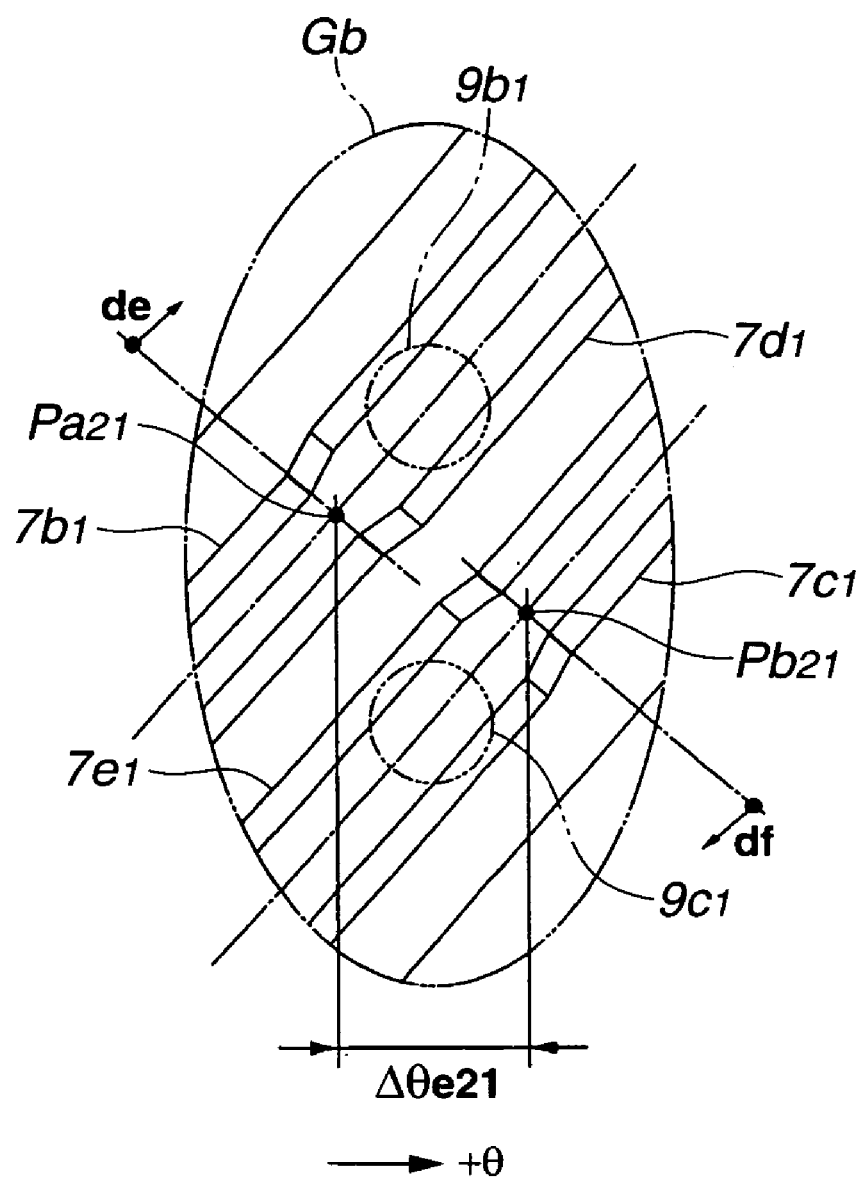
FIG. 8 is an enlarged development view of a cam groove switch portion of the cam frame shown in FIG. 4 as a second modified example.

FIG. 8 is an enlarged development view of the cam groove switch portion (around switch range $\Delta\theta e21$) of the cam frame according to the modified example.

The cam frame 7 of the modified example is designed to eliminate clogging expected to occur in the cam groove switch rotational range, and to reduce oscillation of the second group frame 9 to the minimum.

In the cam frame of the modified example, in the range between the wide rotational position $\theta w$ and the tele rotational position $\theta t$ of one of three pairs of cam grooves/loose fit grooves, a cam groove switch rotational range $\Delta\theta e21$ is provided instead of the cam groove switch rotational position $\theta e1$ in the first embodiment.

The cam groove switch rotational range $\Delta\theta e21$ includes a groove switch point Pa21 at which the cam groove 7b1 with which the cam follower 9b1 is engagebale is communicated with the loose fit groove 7d1 with which the cam follower 9b1 is loosely fit, and a groove switch point Pb21 at which the loose fit groove 7e1 with which the cam follower 9c1 is loosely fit is communicated with the cam groove 7c1 with which the cam follower 9c1 is engageable. The range from the groove switch point Pa21 toward the $+\theta$ side of the rotational angle is a range de where the cam follower is loosely fit. The range from the groove switch point Pb21 toward the $-\theta$ side of the rotational angle is a range df where the cam follower is loosely fit.

The range of the rotational angle of the cam frame 7 from the groove switch point Pa21 to the groove switch point Pb21 for loose fitting becomes the cam groove switch rotational range $\Delta\theta e21$ that allows switching in the modified example.

Each of the other two pairs of cam grooves/loose fit grooves includes cam groove switch rotational ranges $\Delta\theta e22$ and $\Delta\theta e23$ (not shown) that allow switching for loose fitting instead of the cam groove switch rotational points $\theta e2$ and $\theta e3$ in the embodiment.

Those cam groove switch rotational areas $\Delta\theta e21$, $\Delta\theta e22$ and $\Delta\theta e23$ are arranged so as not to be overlapped with one another in the rotational range from the wide rotational position $\theta w$ to the tele rotational position $\theta t$. This may prevent two or three of the cam groove switch rotational ranges $\Delta\theta e21$, $\Delta\theta e22$ and $\Delta\theta e23$ from being overlapped during rotation of the cam frame 7. In other words, the simultaneous switching operation never occurs.

In the modified example, upon zooming from the wide state to the tele state, the cam frame 7 rotates to allow a pair of cam followers to reach the cam groove switch rotational range $\Delta\theta e21$ where the cam followers 9b1 and 9c1 are respectively loosely inserted into the loose fit grooves 7d1 and 7e1 simultaneously. One pair of the cam followers 9b2 and 9b3 of the other two pairs are tightly engaged with the corresponding cam grooves 7b2 and 7b3, respectively.

Accordingly, when the cam followers are in the cam groove switch rotational area $\Delta\theta e21$, the second group frame 9 is supported in the state where the cam followers are tightly engaged with the cam grooves at least at two points. The drive for projection is performed without looseness nor oscillation.

Thereafter, when the cam frame 7 reaches the cam groove switch rotational range $\Delta\theta e21$, and further $\Delta\theta e22$, the second group frame 9 is supported in the state where the cam followers are tightly engaged with the cam grooves at least at two points likewise the state in the cam groove switch rotational range $\Delta\theta e21$.

As described above, in the case where the cam frame according to the modified example is employed, even if the gap from the loose fit groove is generated upon switching of one pair of the cam followers in the cam groove switch rotational range, the second group frame 9 may be supported at the other two pairs of the cam followers with no looseness. This may reliably suppress looseness and oscillation upon driving for switching the cam groove of the second group frame 9. This may further eliminate clogging of the cam follower.

In the second modified example, when the cam groove of the cam frame and the cam follower of the second group frame 9 slidably contact and engage at three points, they slidably contact and engage at two points momentarily. Then, they engage at three points. The slidable contact and engagement at two points occurs momentarily three times during the entire cam locus cycle. It is required to set values of the aforementioned S1 and S2 in the second modified example such that the aforementioned cycle is executed by repetition of the slidable contact and engagement at two points and subsequent slidable contact and engagement at three points.

In the second modified example, if the engagement of the cam follower at two points affects the captured image, zoom drive control means, for example, a motor (not shown) as a drive source for zooming is used to execute the control for inhibiting the zoom stop at this point for the purpose of solving the aforementioned problem.

Supposing that the cam groove switch point Pa1 shown in FIG. 6 is set as the reference in the embodiment, the other cam groove switch point Pb1 is at the same point as the cam groove switch rotational position θ for the switch point Pa1. Meanwhile, in the first modified example, supposing that the switch point Pa11 is set as the reference, the other switch point Pb11 is at the −θ side of the switch point Pa11. In the second modified example, supposing that the switch point Pa21 is set as the reference, the other switch point Pb21 is at the +θ side of the switch point Pa21.

A lens barrel according to a second embodiment of the present invention will be described referring to FIG. 9.

Figure 9:
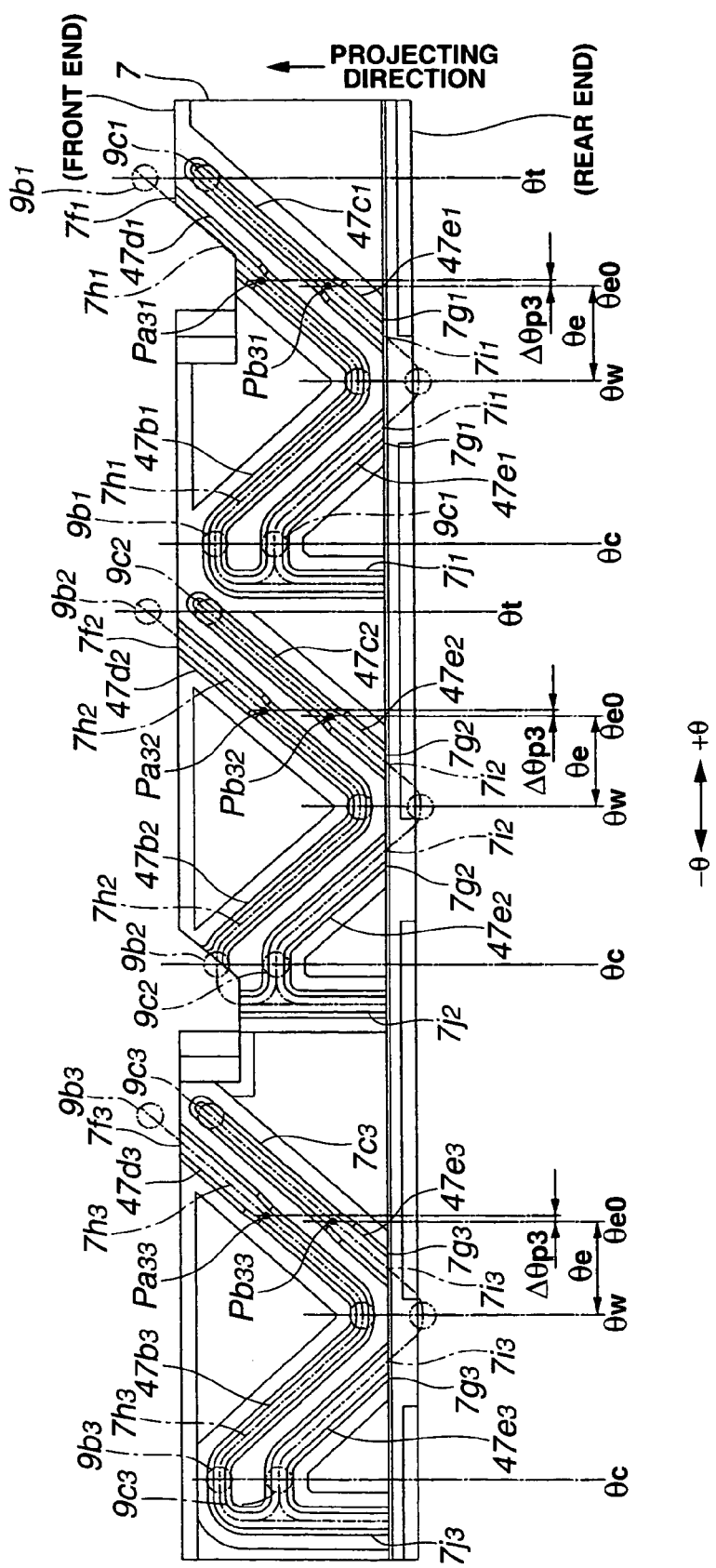
FIG. 9 is a development view of an inner peripheral surface of a cam frame applied to the lens barrel in a second embodiment of the invention in which a cam groove is formed.
Figure 10:
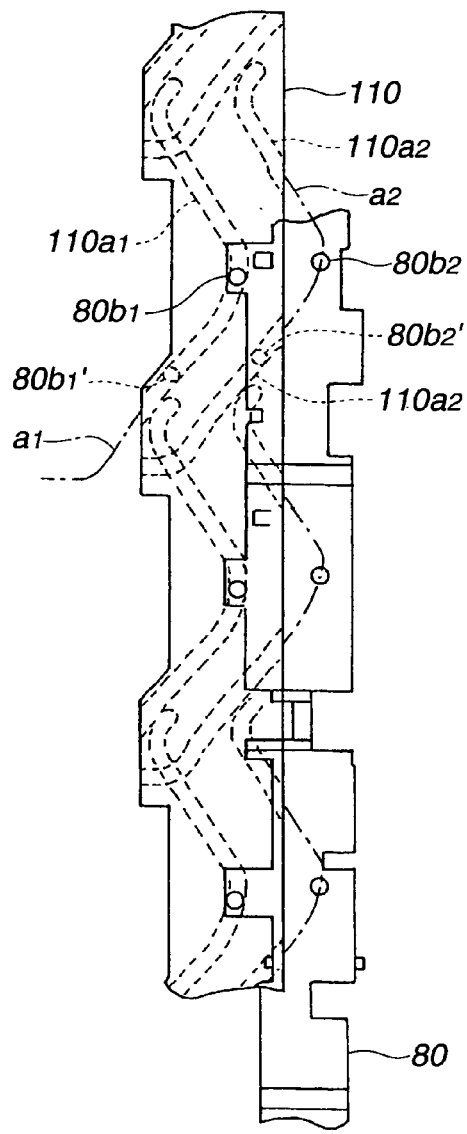
FIG. 10 is a development view of a cam groove engaged with a cam follower provided with a cam ring and a movable ring of a generally employed lens barrel in a wide position.
Figure 11:
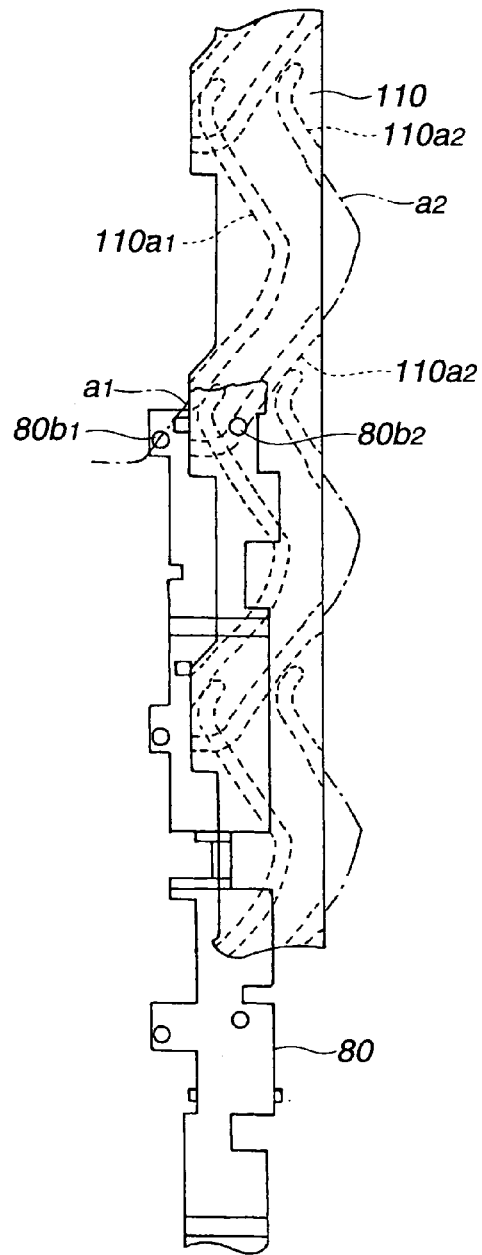
FIG. 11 is a development view of a cam groove engaged with the cam follower provided with the cam ring and the movable ring of the generally employed lens barrel shown in FIG. 10 in a tele position.

FIG. 9 is a development view of the inner peripheral surface of the cam frame employed for the lens barrel of the embodiment. The rotational angle and the direction thereof (+, −θ) with respect to the cam follower of the cam frame shown in FIG. 9 are the same as those shown in FIG. 5.

In the lens barrel of the embodiment, the structure of the cam groove switch portion of the cam frame with respect to the cam follower of the second group frame is different from that of the lens barrel in the first embodiment. The other structure is the same as that of the first embodiment. The same employed members as those of the first embodiment are designated with the same reference numerals, and only the structure and operation of the different portion will be described hereinafter.

A cam frame 47 as the second frame member in the embodiment has the same structure as that of the cam frame 7 of the first embodiment shown in FIG. 8 except the configuration of the cam groove switch portion.

Three pairs of cam loci each pair of which forms the center path of the cam groove and the loose fit groove are provided at three different positions in the circumferential direction on the inner peripheral surface of the cam frame 47 in the same way as the cam frame 7. One pair is formed of a cam locus (first cam locus) 7h1 and a cam locus (second cam locus) 7i1.

Another pair of the cam loci positioned adjacent around the −θ side of the cam locus is formed of a cam locus (first cam locus) 7h2 and a cam locus (second cam locus) 7i2 which are congruent with the cam loci 7h1 and 7h1, respectively.

Furthermore, another pair of the cam loci adjacently positioned around further the −θ side of the cam locus is formed of a cam locus (first cam locus) 7h3 and a cam locus (second cam locus) 7i3 which are congruent with the cam loci 7h1 and 7i1, respectively.

Each distance between the cam loci 7h1 and 7i1, 7h2 and 7i2, and 7h3 and 7i3 in the direction of the optical axis O is the same as the distance between the pair of cam followers of the second group frame 9 in the direction of the optical axis O.

One pair of those three pairs of the cam groove and loose fit groove is formed of a cam groove (first cam groove) 47b1 formed along the cam locus 7h1, a loose fit groove (first clearance, disengaged portion) 47d1 connected to the +θ side of the cam groove in communication therewith, a loose fit groove (second clearance, disengaged portion) 47e1 formed along the cam locus 47i1, and a cam groove (second cam groove) 47c1 connected to the +θ side of the loose fit groove in communication therewith.

Another pair is formed of a can groove (third, first cam groove) 47b2 formed along the cam locus 7h2, a loose fit groove (third, first clearance, disengaged portion) 47d2 connected to the +θ side of the cam groove in communication therewith, a loose fit groove (fourth, second clearance, disengaged portion) 47e2 formed along the cam locus 7i2, and a cam groove (fourth, second cam groove) 47e2 connected to the +θ side of the loose fit groove in communication therewith.

Furthermore, another pair is formed of a cam groove (third, first cam groove) 47b3 formed along the cam locus 7h3, a loose fit groove (third, first clearance, disengaged portion) 47d3 connected to the +θ side of the can groove in communication therewith, a loose fit groove (fourth, second clearance, disengaged portion) 47e3 formed along the can locus 7i3, and a cam groove (fourth, second cam groove) 47c3 connected to the +θ side of the loose fit groove in communication therewith.

The loose fit grooves 47d1, 47d2 and 47d3 terminate at the front end of the cam frame 47, and have groove openings 7f1, 7f2 and 7f3, respectively. The loose fit grooves 47e1, 47e2 and 47e3 disappear at the rear end of the cam frame 47, and have two groove openings 7g1, 7g2 and 7g3, respectively.

Each of the can grooves 47b1, 47b2, 47b3, 47c1, 47c2 and 47c3 has a trapezoidal cross section having a width with which the cam follower of the second group frame 9 is tightly engaged (more specifically, the cross section having its width narrowed as the depth increases).

Each of the loose fit grooves 47d1, 47d2, 47d3, 47i1, 47i2 and 47i3 has a trapezoidal cross section having a width with which the cam follower of the second group frame 9 is loosely inserted (fit) with a gap (more specifically, the cross section having its width narrowed as the depth increases).

The cam grooves 47b1, 47b2 and 47b3 are communicated with the loose fit grooves 47d1, 47d2 and 47d3 at the groove switch points Pa31, Pa32 and Pa33, respectively. The groove width is gradually widened in the direction of the cam locus from the groove switch points toward the respective loose fit grooves (+θ side).

Likewise, the cam grooves 47c1, 47c2 and 47c3 are communicated with the loose fit grooves 47e1, 47e2 and 47e3 at the groove switch points Pb31, Pb32 and Pb33, respectively. The groove width is gradually widened in the direction of the cam locus from the groove switch points toward the respective loose fit grooves (−θ side).

The groove switch points Pa31 and Pb31, Pa32 and Pb32, and Pa33 and Pb33 locate in a range from the wide rotational position θw to the tele rotational position θt of the cam frame 47 in pairs, respectively.

The groove switch points Pa31 is apart from Pb31 to the +θ side by a distance corresponding to the rotational angle Δθp3. Likewise the groove switch points Pa32 is apart from Pb32 to the +θ side by the distance corresponding to the same rotational angle Δθp3. Further, the groove switch points Pa33 is apart from Pb33 to the +θ side by the distance corresponding to the same rotational angle Δθp3. Meanwhile, the groove switch points Pa31, Pa32 and Pa 33 are positioned at the rotational position θe0 defined by the rotation by a predetermined rotational angle θe from the corresponding wide rotational position θw.

The predetermined angle Δθp3 is set in consideration to cover the range where the cam follower displaces with respect to the cam groove owing to the dimension accuracy at least in the cam frame 47 and the second group frame 9 or the assembly accuracy. Accordingly, it may be set such that the range where the cam grooves 47b1 and 47c1 at least partially overlaps exists even to a small degree irrespective of variation in accuracy of the dimension or assembly.

The cam follower of the second group frame 9 is tightly engaged with the cam groove of the cam frame 47 (no gap or only tiny gap is allowed), or is loosely fit with the loose fit groove of the cam frame 47 (loosely fit in the disengaged state). As the cam frame 47 rotates, the second group frame 9 is driven to move forward/backward via the cam groove and the cam follower.

In the present embodiment, when the lens barrel is in the retracted state, the cam frame 47 locates at the retracted rotational position (angle) θc with respect to the cam follower. The cam frame 47 starts rotating toward the +θ direction relative to the cam follower from the retracted state to reach the wide rotational position θw. The second group frame 9 is then retracted to the wide position relative to the cam frame 47. The aforementioned operation is the same as the one described in the first embodiment.

Thereafter, when the cam frame 47 starts rotating from the wide rotational position θw toward the tele rotational position θt, the second group frame 9 is projected forward while holding the cam followers 9b1, 9b2 and 9b3 engaged with the cam grooves 47b1, 47b2 and 47b3. The other cam followers 9c1, 9c2 and 9c3 are inserted into the loose fit grooves 47e1, 47e2 and 47e3 each with a gap.

When the cam frame 47 reaches the cam groove switch rotational position θe0 with respect to the cam follower, the cam follower 9c1 reaches the groove switch point Pb31 while holding the other cam follower 9b1 engaged with the cam groove 47b1.

The state of the cam follower 9c1 is switched to be engaged with the cam groove 47c1. At the same time, the other two pairs of the cam followers, the cam followers 9c2 and 9c3 reach the groove switch points Pb32 and Pb33, respectively while holding the cam followers 9b2 and 9b3 engaged with the cam grooves 47b2 and 47b3, respectively. The state of the cam followers 9c2 and 9c3, thus, are switched to be engaged with the cam grooves 47c2 and 47c3, respectively.

During the period for which the cam frame 47 rotates in the range corresponding to the rotational angle Δθp3, the engagements of the cam followers 9b1, 9b2 and 9b3 with the cam grooves 47b1, 47b2 and 47b3 are held, as well as those of the cam followers 9c1, 9c2 and 9c3 with the cam grooves 47c1, 47c2 and 47c3.

When the cam frame 47 completes rotating by an amount of the range corresponding to the rotational angle Δθp3, the cam followers 9b1, 9b2 and 9b3 reach the groove switch points Pa31, Pa32 and Pa33, respectively. Thereafter, they are inserted into the loose fit grooves 47d1, 47d2 and 47d3 such that the engagement state is switched to the loose fit state with a gap. However, the cam followers 9c1, 9c2 and 9c3 are kept tightly engaged with the cam grooves 47c1, 47c2 and 47c3, respectively.

Then the cam frame 47 is driven toward the +θ side of the cam follower to project the second group frame 9 toward the tele position while holding the engagement states of the cam followers 9c1, 9c2 and 9c3 engaged with the cam grooves 47c1, 47c2 and 47c3 as well as the other cam followers 9b1, 9b2 and 9b3 inserted into the loose fit grooves 47d1, 47d2 and 47d3, respectively.

Before the cam frame 47 reaches the tele rotational position θt, the cam followers 9b1, 9b2 and 9b3 are disengaged from the loose fit grooves 47d1, 47d2 and 47d3 so as to be released to project forward from the front end of the cam frame 47. The second group frame 9 also partially projects from the front end.

As described above, the lens barrel according to the embodiment is provided with three pairs of cam followers and three pairs of cam grooves likewise the lens barrel according to the first embodiment. The resultant operation range of the second group frame 9 may be further enlarged. As the second group frame 9 is stored in the cam frame 47 in the retracted state, the length of the lens barrel may also be reduced.

Especially in the present embodiment, the cam groove switch rotational ranges for the three pairs of the cam followers are arranged in the same small rotational range such that the pairs of the cam followers are held in tight during the switching operation. Accordingly, no play occurs in the cam follower during the cam groove switching operation, thus preventing oscillation of the second group frame 9 and suppressing blurring of the captured image.

As the cam groove switch rotational range is considerably small, hardly any clogging occurs in the cam engagement. This makes it possible to avoid large change in the rotational load of the cam frame 47, thus suppressing the torque required for the zoom drive motor. Since the drive load is reduced as described above, each weight and size of those rotary frame 3, cam frame 47, second group frame 9 and the like may be reduced.

The lens barrel according to the present invention employs the short frame member, provides the large amount of forward/backward movement, resistance against the load of the forward/backward movement, and little fluctuation thereof. The lens barrel further allows for smooth forward/backward movement and prevents blurring of the captured image.

It is to be understood that the present invention is not limited to the embodiments as described above, and various modification may be implemented without departing from the scope of the invention. The aforementioned embodiments contain the invention in various stages such that a plurality of disclosed components may be arbitrarily combined for the purpose of providing various types of the invention.

What is claimed is:

1. A lens barrel comprising:
 a first frame member movable in a direction of an optical axis having a first cam follower and a second cam follower; and
 a second frame member formed of a cylindrical member having a pair of opening ends at both ends, which is rotatable around the optical axis relative to the first frame member, including:
  a first cam groove having a portion of a cam engaged with the first cam follower formed on a circumferential surface, the cam disappearing at an intermediate point of the circumferential surface, and releasing an engagement with the first cam follower on a first cam locus required for moving the first frame member in the direction of the optical axis;
  a first disengaged portion at which the first cam follower is not engaged from an end where the first cam groove disappears to one end of the pair of opening ends on the cam locus;
  a second cam groove formed on the circumferential surface, and engaged with the second cam follower while the first cam follower is not engaged with the first cam groove on a second cam locus which is different from but congruent with the first cam locus required for moving the first frame member in the direction of the optical axis; and a second disengaged portion that is not engaged with the second cam follower on the second cam locus while the first cam follower is engaged with the first cam groove, and is being cut out at an intermediate point of the second cam locus and at the other end of the pair of opening ends, wherein an engagement state is switched between an engagement of the first cam follower with the first cam groove and an engagement of the second cam follower with the second cam groove accompanied with a rotation of the second frame member.

2. The lens barrel according to claim 1, wherein the number of pairs which each include the first cam groove and the first cam follower is plural and is equal to the number of pairs which each include the second cam groove and the second cam follower.

3. The lens barrel according to claim 2, wherein:

the first frame member includes a plurality of pairs of cam followers formed of the first cam followers and the second cam followers, which are arranged to be distributed on the circumferential surface of the first frame member;

the second frame member includes a plurality of pairs of cam grooves formed of the first cam grooves and the second cam grooves, the number of which is the same as that of the pair of cam followers; and a position of the pair of cam followers arranged in a circumferential direction is different from that of the pair of cam grooves arranged in the circumferential direction.

4. The lens barrel according to claim 1, wherein the first and the second disengaged portions are loose fit grooves with which the first and the second cam followers are not engaged.

5. The lens barrel according to claim 1, wherein while the engagement state is switched between the engagement of the first cam follower with the first cam groove and the engagement of the second cam follower with the second cam groove, the engagement of the first cam follower with the first cam groove occurs simultaneously with the engagement of the second cam follower with the second cam groove.

6. The lens barrel according to claim 1, wherein while the engagement state is switched between the engagement of the first cam follower with the first cam groove and the engagement of the second cam follower with the second cam groove, a disengagement of the first cam follower from the first cam groove occurs simultaneously with a disengagement of the second cam follower from the second cam groove.

7. The lens barrel according to claim 1, wherein while the engagement state is switched between the engagement of the first cam follower with the first cam groove and the engagement of the second cam follower with the second cam groove, only one of the engagement of the first cam follower with the first cam groove and the engagement of the second cam follower with the second cam groove occurs.

8. A lens barrel comprising:

a first frame member movable in a direction of an optical axis having a first cam follower and a second cam follower; and a second frame member rotatable around the optical axis including:

a first cam groove engaged with the first cam follower formed on a circumferential surface of the first frame member accompanied with a rotation of the second frame member, and disappears at an intermediate point on the circumferential surface of the second frame member;

a first clearance continued with the first cam groove at the intermediate point on the circumferential surface to avoid a contact with the first cam follower;

a second clearance that does not contact with the second cam follower on the circumferential surface of the second frame member while the first cam follower is engaged with the first cam groove; and a second cam groove engaged with the second cam follower at the intermediate point on the circumferential surface of the second frame member accompanied with the rotation of the second frame member while the first cam follower is not engaged with the first cam groove, wherein an engagement state is switched between an engagement of the first cam follower with the first cam groove and an engagement of the second cam follower with the second cam groove accompanied with the rotation of the second frame member.

9. The lens barrel according to claim 8, wherein the number of pairs which each include the first cam groove and the first cam follower is plural and is equal to the number of pairs which each include the second cam groove and the second cam follower.

10. The lens barrel according to claim 9, wherein:

the first frame member includes a plurality of pairs of cam followers formed of the first cam followers and the second cam followers, which are arranged to be distributed on the circumferential surface of the first frame member;

the second frame member includes a plurality of pairs of cam grooves formed of the first cam grooves and the second cam grooves, the number of which is the same as that of the pair of cam followers; and a position of the pair of cam followers arranged in the circumferential direction is different from that of the pair of cam grooves arranged in the circumferential direction.

11. The lens barrel according to claim 8, wherein the first and the second disengaged portions are loose fit grooves with which the first and the second cam followers are not engaged.

12. The lens barrel according to claim 8, wherein while the engagement state is switched between the engagement of the first cam follower with the first cam groove and the engagement of the second cam follower with the second cam groove, the engagement of the first cam follower with the first cam groove occurs simultaneously with the engagement of the second cam follower with the second cam groove.

13. The lens barrel according to claim 8, wherein while the engagement state is switched between the engagement of the first cam follower with the first cam groove and the engagement of the second cam follower with the second cam groove, a disengagement of the first cam follower from the first cam groove occurs simultaneously with a disengagement of the second cam follower from the second cam groove.

14. The lens barrel according to claim 8, wherein while the engagement state is switched between the engagement of the first cam follower with the first cam groove and the engagement of the second cam follower with the second cam groove, only one of the engagement of the first cam follower with the first cam groove and the engagement of the second cam follower with the second cam groove occurs.

15. A lens barrel comprising:

a first frame member formed of a frame member movable in a direction of an optical axis, provided with a first cam follower unit including a first cam follower and a second cam follower, and a second cam follower unit including a third cam follower and a fourth cam follower; and a second frame member formed of a frame member rotatable around an optical axis, including:

a first cam unit, which is a cam unit provided on a circumferential surface of the frame member, including:

a first cam groove engaged with the first cam follower accompanied with a rotation of the frame member, which disappears at an intermediate point on a circumferential surface of the frame member;

a first clearance continued with the first cam groove at the intermediate point on the circumferential surface to avoid a contact with the first cam follower;

a second clearance that does not contact with the second cam follower on the circumferential surface of the frame member while the first cam follower is engaged with the first cam groove; and a second cam groove engaged with the second cam follower at the intermediate point on the circumferential surface of the frame member accompanied with the rotation of the frame member while the first cam follower is not engaged with the first cam groove, the first cam unit switching between the first cam groove and the second cam groove, and a second cam unit, which is a cam unit provided on the circumferential surface of the frame member, including:

a third cam groove engaged with the third cam follower accompanied with the rotation of the frame member, which has the same configuration as that of the first cam groove and disappears at an intermediate point of the circumferential surface of the frame member;

a third clearance continued with the third cam groove at the intermediate point on the circumferential surface to avoid a contact with the third cam follower;

a fourth clearance that does not contact with the fourth cam follower on the circumferential surface of the frame member while the third cam follower is engaged with the third cam groove; and a fourth cam groove engaged with the fourth cam follower at the intermediate point on the circumferential surface of the frame member accompanied with the rotation of the frame member while the third cam follower is not engaged with the third cam groove, which has the same configuration as that of the second cam groove, the second cam unit switching between the third and the fourth cam grooves, wherein switching between the first cam unit and the first cam follower unit, and the second cam unit and the second cam follower unit is sequentially performed.

16. The lens barrel according to claim 15, wherein the first cam unit and the second cam unit are arranged at different positions in a circumferential direction of the second frame member.

17. The lens barrel according to claim 15, wherein while the engagement state is switched between the engagement of the first cam follower with the first cam groove and the engagement of the second cam follower with the second cam groove, the engagement of the first cam follower with the first cam groove occurs simultaneously with the engagement of the second cam follower with the second cam groove.

18. The lens barrel according to claim 15, wherein while the engagement state is switched between the engagement of the first cam follower with the first cam groove and the engagement of the second cam follower with the second cam groove, a disengagement of the first cam follower from the first cam groove occurs simultaneously with a disengagement of the second cam follower from the second cam groove.

19. The lens barrel according to claim 15, wherein while the engagement state is switched between the engagement of the first cam follower with the first cam groove and the engagement of the second cam follower with the second cam groove, only one of the engagement of the first cam follower with the first cam groove and the engagement of the second cam follower with the second cam groove occurs.

* * * * *